United States Patent
Shiu

(10) Patent No.: US 11,188,981 B1
(45) Date of Patent: Nov. 30, 2021

(54) IDENTIFYING MATCHING TRANSFER TRANSACTIONS

(71) Applicant: Intuit Inc., Mountain View, CA (US)

(72) Inventor: Eric King Loong Shiu, Milpitas, CA (US)

(73) Assignee: Intuit Inc., Mountain View, CA (US)

(*) Notice: Subject to any disclaimer, the term of this patent is extended or adjusted under 35 U.S.C. 154(b) by 9 days.

(21) Appl. No.: 16/546,050

(22) Filed: Aug. 20, 2019

(51) Int. Cl.
*G06Q 40/02* (2012.01)
*G06F 16/901* (2019.01)
*G06Q 30/02* (2012.01)
*G06N 20/00* (2019.01)

(52) U.S. Cl.
CPC ....... *G06Q 40/025* (2013.01); *G06F 16/9027* (2019.01); *G06N 20/00* (2019.01); *G06Q 30/0201* (2013.01)

(58) Field of Classification Search
CPC .. G06Q 40/025; G06Q 30/0201; G06N 20/00; G06F 16/9027
See application file for complete search history.

(56) References Cited

U.S. PATENT DOCUMENTS

| | | | | |
|---|---|---|---|---|
| 6,685,088 B1* | 2/2004 | Royer | | G06Q 20/04 235/380 |
| 7,624,073 B1* | 11/2009 | Robinson | | G06Q 20/04 705/67 |
| 10,163,158 B2* | 12/2018 | Song | | G06Q 20/4016 |
| 2003/0204456 A1* | 10/2003 | Engdahl | | G06Q 20/381 705/30 |
| 2004/0162771 A1* | 8/2004 | Tamatsu | | G06Q 40/12 705/30 |
| 2005/0222929 A1* | 10/2005 | Steier | | G06Q 40/00 705/35 |
| 2008/0010189 A1* | 1/2008 | Rosenberger | | G06Q 20/10 705/39 |
| 2008/0183520 A1* | 7/2008 | Cutts | | G06Q 10/0639 705/7.36 |
| 2013/0297490 A1* | 11/2013 | McWhinney | | G06Q 20/22 705/39 |
| 2015/0206252 A1* | 7/2015 | Rephlo | | G06Q 40/12 705/30 |

(Continued)

*Primary Examiner* — Jamie R Kucab
*Assistant Examiner* — Pierre L Maccagno
(74) *Attorney, Agent, or Firm* — Ferguson Braswell Fraser Kubasta PC

(57) ABSTRACT

A method may include obtaining unpaired transactions each including a transaction ID, an entity ID, and attributes that each correspond to an attribute type, deriving transaction groups by grouping the unpaired transactions using their entity IDs, and dividing a transaction group into a first transaction subgroup and a second transaction subgroup. The method may further include constructing a tree for the first transaction subgroup based on an attribute type, and matching a first transaction of the first transaction subgroup with a second transaction of the second transaction subgroup by searching the tree while applying a matching criterion to the transactions of the second transaction subgroup. The matching criterion may correspond to the attribute type. The method may further include: forming a matched transfer pair including the entity ID of the transaction group, the transaction ID of the first transaction, and the transaction ID of the second transaction.

17 Claims, 12 Drawing Sheets

(56) References Cited

U.S. PATENT DOCUMENTS

2018/0196694 A1* 7/2018 Banerjee .................. G06F 9/466
2019/0057386 A1* 2/2019 Fazeli .................... H04L 63/102
2019/0130453 A1* 5/2019 Sasapu ............... G06Q 30/0631
2019/0311429 A1* 10/2019 Barkas ................. G06Q 40/025

* cited by examiner

Initial Unpaired Transactions Table 470

| | | Business Entity ID 472 | Account ID 474 | Transaction ID 476 | Time stamp 478 | Amount 480 |
|---|---|---|---|---|---|---|
| Transaction Group A 484A | Transaction A 482A | c001 | a001 | t001 | 2/8 | $1000 |
| | Transaction B 482B | c001 | a002 | t002 | 2/8 | -$1001 |
| | Transaction C 482C | c001 | a003 | t003 | 2/16 | -$1000 |
| | Transaction D 482D | c001 | a001 | t004 | 2/19 | $1000 |
| | Transaction E 482E | c001 | a002 | t005 | 2/20 | -$1000 |
| Transaction Group B 484B | Transaction F 482F | c001 | a003 | t006 | 2/16 | -$34.56 |
| | Transaction G 482G | c001 | a001 | t008 | 2/17 | $34.56 |
| | Transaction H 482H | c001 | a002 | t009 | 2/18 | -$34.56 |
| Transaction Group C 484C | Transaction I 482I | c001 | a003 | t010 | 2/22 | $5000 |
| | Transaction J 482J | c001 | a003 | t011 | 2/23 | -$5000 |
| | ⋮ | | | | | |
| Additional Transactions 486 | Transaction K 482K | c001 | a001 | t007 | 2/17 | $1000 |
| | Transaction L 482L | c001 | a003 | t012 | 2/14 | $1000 |
| | ⋮ | | | | | |

FIG. 4C

Pairing Results Table 490

| Business Entity ID 472 | Transaction ID 476 | Paired Transaction ID 492 |
|---|---|---|
| c001 | t001 | t002 |
| c001 | t004 | t005 |
| c001 | t008 | t009 |

Matched Transfer Pair A 494A → (row 1)
Matched Transfer Pair B 494B → (row 2)
Matched Transfer Pair C 494C → (row 3)

⋮

| c001 | t003 | t007 |

Matched Transfer Pair D 494D → (row above)

| Updated Unpaired Transactions Table 499 | Business Entity ID 472 | Account ID 474 | Transaction ID 476 | Time stamp 478 | Amount 480 |
|---|---|---|---|---|---|
| Transaction F 482F | c001 | a003 | t006 | 2/16 | -$34.56 |
| Transaction I 482I | c001 | a003 | t010 | 2/22 | $5000 |
| Transaction J 482J | c001 | a003 | t011 | 2/23 | -$5000 |
| Transaction L 482L | c001 | a003 | t012 | 2/14 | $1000 |

IDENTIFYING MATCHING TRANSFER TRANSACTIONS

BACKGROUND

Determining whether a business entity is eligible for a loan often involves estimating the business entity's revenue and/or expenses (e.g., by a financial management application (FMA)) based on the transactions of the business entity at financial institutions. In cases where the business entity transfers money between multiple accounts, both the transfer-in and transfer-out transactions are captured, but the system that processes the transactions may not be able to determine a linkage between the pair of matching transfer transactions. This inability to determine such links may distort the estimated revenue and/or expenses of the business entity, resulting in additional risk for making lending decisions. For example, when a business entity deposits money from its checking account to its savings account, the deposit could be misinterpreted as the business entity's income.

Techniques that analyze individual transactions do not always identify a matching transfer transaction or guarantee the uniqueness of the matching transfer transaction. In addition, processing keywords in textual descriptions associated with the transactions (which may or may not be available) may be insufficient since it may be difficult to detect reliable patterns in the textual descriptions of different financial institutions. Furthermore, text-based rules are prone to error and changes. For example, bank transaction text can be corrupted or truncated. In other cases, text based rules that worked in the past might not work in the future as financial institutions change or update their systems, and. Non-text-based approaches often make strong assumptions on transaction patterns and amounts, and may be unable to cover the variety of practices used by financial institutions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining unpaired transactions each including a transaction ID, an entity ID, and attributes that each correspond to an attribute type, deriving transaction groups by grouping the unpaired transactions using their entity IDs, and dividing a transaction group into a first transaction subgroup and a second transaction subgroup. The method further includes constructing a tree for the first transaction subgroup based on an attribute type, and matching a first transaction of the first transaction subgroup with a second transaction of the second transaction subgroup by searching the tree while applying a matching criterion to the transactions of the second transaction subgroup. The matching criterion corresponds to the attribute type. The method further includes: in response to matching the first transaction with the second transaction, forming a matched transfer pair including the entity ID of the transaction group, the transaction ID of the first transaction, and the transaction ID of the second transaction.

In general, in one aspect, one or more embodiments relate to a system including a memory coupled to a computer processor, a repository configured to store unpaired transactions each including a transaction ID, an entity ID, and attributes that each correspond to an attribute type. The repository is further configured to store transaction groups and a tree for a first transaction subgroup of a transaction group. The system further includes a transaction analyzer, executing on the computer processor and using the memory, configured to derive the transaction groups by grouping the unpaired transactions using the entity ID, divide the transaction group into the first transaction subgroup and a second transaction subgroup, construct the tree for the first transaction subgroup based on an attribute type, and match a first transaction of the first transaction subgroup with a second transaction of the second transaction subgroup by searching the tree while applying a matching criterion to the transactions of the second transaction subgroup. The matching criterion corresponds to the attribute type. The transaction analyzer is further configured to: in response to matching the first transaction with the second transaction, form a matched transfer pair including the entity ID of the transaction group, the transaction ID of the first transaction, and the transaction ID of the second transaction.

In general, in one aspect, one or more embodiments relate to a method including obtaining unpaired transactions including a transaction ID, an entity ID, a business entity ID, and a timestamp, deriving transaction groups by grouping the unpaired transactions using their business entity IDs, and dividing a transaction group into a first transaction subgroup and a second transaction subgroup. The transaction group corresponds to a business entity ID. The method further includes constructing a tree for the first transaction subgroup based on the timestamp, and matching a first transaction of the first transaction subgroup with a second transaction of the second transaction subgroup by searching the tree while applying a matching criterion to the transactions of the second transaction subgroup. The matching criterion corresponds to the timestamp. The method further includes: in response to matching the first transaction with the second transaction, forming a matched transfer pair including the business entity ID, the transaction ID of the first transaction, and the transaction ID of the second transaction.

Other aspects of the invention will be apparent from the following description and the appended claims.

BRIEF DESCRIPTION OF DRAWINGS

FIG. 4A, FIG. 4B, FIG. 4C, FIG. 4D, and FIG. 4E show examples in accordance with one or more embodiments of the invention.

DETAILED DESCRIPTION

Figure 1A:
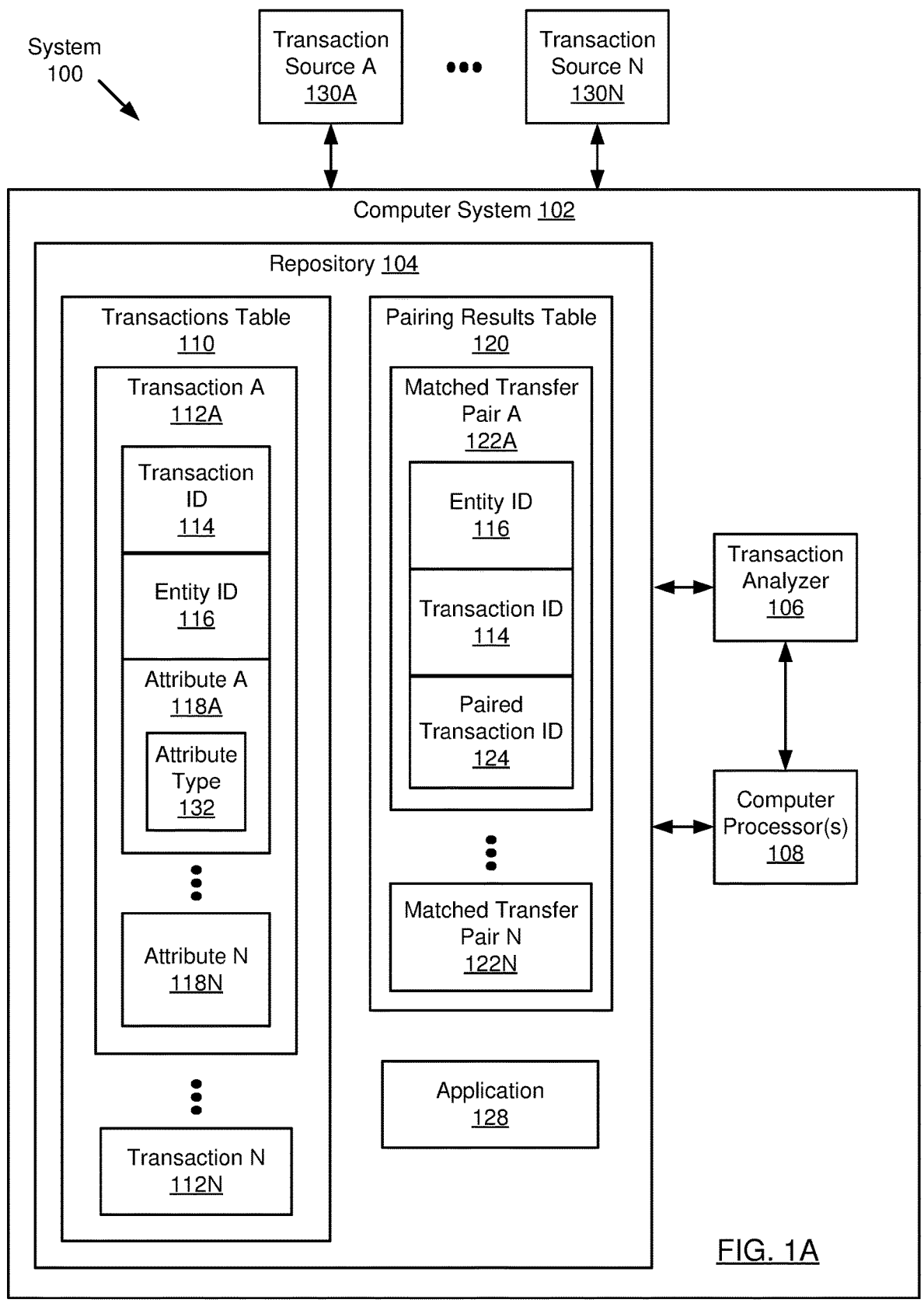
FIG. 1A and FIG. 1B show flow diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to identifying matching transfer transactions to help evaluate the financial status of one or more business entities. In one or more embodiments, transaction groups are derived from transactions by grouping the transactions using a business entity ID and one or more attribute types. For example, the attribute types may be a timestamp and an amount. In one or more embodiments, a transaction group is not processed if the transaction group fails to satisfy verification constraints, thus increasing efficiency and scalability. In addition, the transaction groups may be processed in parallel to also increase efficiency.

A transaction group may be divided into two transaction subgroups. For example, one transaction subgroup may contain transactions corresponding to credits and the other transaction subgroup may contain transactions corresponding to debits. A search tree may be constructed for one of the transaction subgroups using one or more attribute types (e.g., timestamp, account ID, account type, financial institution ID, financial institution type, etc.). In one or more embodiments, a transaction in one transaction subgroup is matched with a transaction in the other transaction subgroup by searching the tree while applying matching criteria corresponding to the attribute types of the transactions. A matching criterion may include a distance measure and a distance constraint. For example, a distance measure for a numerical attribute type (e.g., a timestamp or amount) may be a difference between the numerical values of the corresponding attribute. The distance constraint may be an upper and/or lower bound on the value of the distance measure. For example, the distance constraint for a timestamp may be one week. In one or more embodiments, the distance measures of the matching criteria are combined, using attribute relevance factors that weight the importance of each attribute type, into a combined distance measure that represents an overall distance between two transactions. In one or more embodiments, the matching is performed using a machine learning model trained using distances generated from attributes of historical transaction pairs.

The transaction IDs of the matching transactions may be stored in a unique matched transfer pair. In one or more embodiments, a metric is calculated by excluding matched transfer pairs from the transactions. For example, the metric may be a financial metric such as the revenue or expenses of a business entity. Continuing this example, the financial metric may be calculated by excluding matched transfer pairs, which represent internal transfers of money between accounts of the business entity. Such exclusion is critical. Without excluding the matched transfer pairs, the calculation of the metric would be inaccurate and cause either an overstatement or understatement of the financial status of one or more business entities, because the internal transfers do not count toward revenue or expenses.

FIG. 1A shows a system (100) in accordance with one or more embodiments of the invention. As shown in FIG. 1A, the system (100) includes a computer system (102) and transaction sources (130A, 130N). The computer system (102) and the transaction sources (130A, 130N) may correspond to the computing system (500) described with respect to FIG. 5A and the accompanying description below, or take the form of the client device (526) described with respect to FIG. 5B. In one or more embodiments, the computer system (102) and the transaction sources (130A, 130N) may communicate via a computer network (not shown) (e.g., the network (520) described with respect to FIG. 5B).

In one or more embodiments, a transaction source (130A) stores transactions (e.g., 112A, 112N). Examples of transaction sources may include financial institutions (e.g., credit card issuers), retail establishments (e.g., brick and mortar or e-commerce stores), etc. For example, a transaction source (130A) for financial transactions may be a financial institution (e.g., a bank) or credit card processor. Alternatively, a transaction source (130A) for inventory transactions may be a factory or a warehouse.

As shown in FIG. 1A, the computer system (102) includes a repository (104), a transaction analyzer (106), and one or more computer processors (108). In one or more embodiments, the computer processor(s) (108) takes the form of the computer processor(s) (502) described with respect to FIG. 5A and the accompanying description below. In one or more embodiments, the computer processor (108) includes functionality to execute the transaction analyzer (106).

In one or more embodiments, the repository (104) may be any type of storage unit and/or device (e.g., a file system, database, collection of tables, or any other storage mechanism) for storing data. Further, the repository (104) may include multiple different storage units and/or devices. The multiple different storage units and/or devices may or may not be of the same type or located at the same physical site. user ID In one or more embodiments, the repository (104) includes a transactions table (110), a pairing results table (120), and an application (128). In one or more embodiments, the transactions table (110) includes transactions (112A, 112N). In one or more embodiments, a transaction (112A) includes a transaction ID (114), an entity ID (116), and attributes (118A, 118N). The transaction ID (114) may be an identifier (e.g., a unique identifier) corresponding to the transaction (112A). The entity ID (116) may be an identifier of an entity corresponding to the transaction (112A). For example, the entity may be a company or individual that sends or receives an amount of money in a financial transaction. The attributes (118A, 118N) may describe an event recorded by the transaction (112A). For example, a transaction (112A) may record a monetary transfer processed by a financial institution (e.g., a bank, credit card company, brokerage company, etc.). Continuing this example, a transaction (112A) may record a transfer of funds deposited into an account. Alternatively, a transaction (112A) may record a transfer of funds withdrawn from an account. In one or more embodiments, each attribute (118A, 118N) may correspond to an attribute type (132). Examples of attribute types (132) associated with financial transactions may include: timestamp, account ID, account type, financial institution ID, financial institution type, amount, description, terms, etc. In one or more embodiments, the transaction ID (114) and the entity ID (116) are attributes that correspond to a transaction ID attribute type and an entity attribute type, respectively.

In one or more embodiments, the pairing results table (120) includes matched transfer pairs (122A, 122N). In one or more embodiments, a matched transfer pair (122A) is a pair of transactions that are matched relative to one or more attributes (118A, 118N). A matched transfer pair (122A) may include an entity ID (116), a transaction ID (114), and a paired transaction ID (124). In one or more embodiments, the paired transaction ID (124) is a transaction ID corresponding to a transaction that matches the transaction (112A) identified by the transaction ID (114). For example, one transaction in the matched transfer pair may transfer (e.g., deposit) an amount of money into an account corresponding to the entity ID, and the other transaction in the matched transfer pair may transfer (e.g., withdraw) an equivalent amount of money out of an account corresponding to the entity ID. In other words, the matched transfer pair in this example represents an internal transfer of money between accounts of the same entity. Alternatively, one transaction in the matched transfer pair may transfer an amount (e.g., quantity) of goods to one location corresponding to the entity ID, and the other transaction in the matched transfer pair may transfer an equivalent amount of goods from another location corresponding to the entity ID. In other words, the matched transfer pair in this example represents an internal transfer of goods between locations of the same entity. For example, the goods may be finished products, work-in-process, raw materials, etc., and the locations may be warehouses, distribution centers, retail outlets, etc.

In one or more embodiments, each matched transfer pair (122A, 122N) in the pairing results table (120) is unique. In other words, the combination of the entity ID (116), transaction ID (114), and paired transaction ID (124) appears at most once in the pairing results table (120).

In one or more embodiments, an application (128) is any software application used by multiple users (e.g., over a network). An application (128) may include functionality to store, process and/or analyze various types of transactions (112A, 112N). An application (128) may be a financial management application (FMA) that stores information about financial transactions of users and enables users to manage their financial activities. An application (128) may be a collection of source code including various software components. The application (128) may include statements written in a programming language, or intermediate representation (e.g., byte code). The application (128) may be transformed by a compiler into binary machine code. Compiled machine code may be executed by the processor (108) in order to execute software components generated from the application (128). In one or more embodiments, the application (128) may be any collection of object code (e.g., machine code generated by a compiler) or another form of the application (128).

Figure 1B:
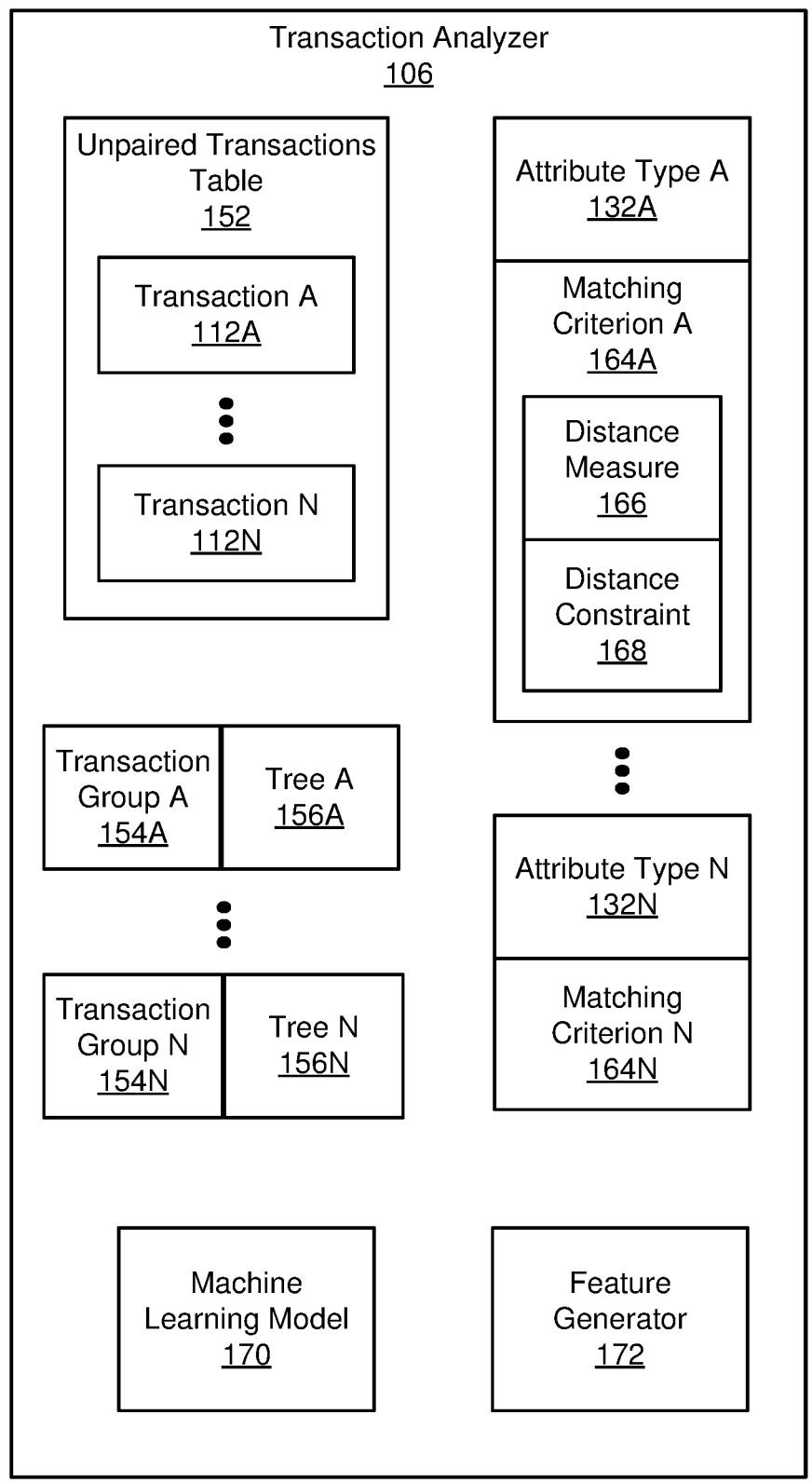

In one or more embodiments, the transaction analyzer (106) may be implemented in hardware (e.g., circuitry), software, firmware, and/or any combination thereof. Turning to FIG. 1B, in one or more embodiments, the transaction analyzer (106) includes functionality to create an unpaired transactions table (152). The unpaired transactions table (152) may include transactions (112A, 112N) that have not been paired with other transactions (e.g., transactions whose transaction ID does not appear in a matched transfer pair (122A) in the pairing results table (120)). In one or more embodiments, the unpaired transactions table (152) is stored in the repository (104).

In one or more embodiments, the transaction analyzer (106) includes functionality to derive transaction groups (154A, 154N). In one or more embodiments, a transaction group (154A) is a subset of transactions (112A, 112N) that include the same entity ID (116). In one or more embodiments, a transaction group (154A) is a subset of transactions (112A, 112N) that include similar attributes (118A, 118N). For example, the transactions in a transaction group (154A) may include amounts with similar magnitude. Continuing this example, the amounts in a transaction group (154A) may have magnitudes that lie within a range of magnitudes (e.g., between $1000 and $5000). In one or more embodiments, the transaction groups (154A, 154N) are stored in the repository (104).

In one or more embodiments, the transaction analyzer (106) includes functionality to construct trees (156A, 156N) corresponding to transaction groups (154A, 154N). The tree (156A) may include nodes corresponding to a subgroup of transactions in the transaction group (154A). For example, the transaction subgroup may correspond to transactions including amounts with the same sign. Continuing this example, the amounts in one transaction subgroup may have a negative sign (e.g., because the transactions in the transaction subgroup correspond to debits that withdraw an amount from an account). Similarly, the amounts in another transaction subgroup may have a positive sign (e.g., because the transactions in the transaction subgroup correspond to credits that deposit an amount into an account).

The tree (156A) may be a search tree (e.g., a binary search tree) that facilitates efficient insertion, deletion, access and/or searching of the transactions in the transaction subgroup. In one or more embodiments, the tree (156A) is a k-dimensional tree (KD-tree) where each node is a point in k-dimensional space. A node in the tree (156A) may correspond to one or more dimensions (e.g., attribute types (132)). For example, a node may correspond to a timestamp, an account ID and/or an amount of a transaction (112A). In one or more embodiments, the trees (156A, 156N) are stored in the repository (104). Constructing a KD-tree may be an efficient operation performed in O(N log N) time, where N is the number of nodes to be added to the tree.

In one or more embodiments, the transaction analyzer (106) includes functionality to apply a machine learning model (170) to match a first transaction with a second transaction in a group of transactions. For example, the group of transactions may be a transaction group (154A) or a subgroup of a transaction group (154A). In one or more embodiments, the second transaction represents the best match to the first transaction relative to the transactions in the group of transactions. The machine learning model (170) may be implemented as a classifier. For example, the machine learning model (170) may classify the second transaction as a best match for the first transaction. Continuing this example, the second transaction may correspond to a node in the tree that is a nearest neighbor of the node corresponding to the first transaction. Calculating the nearest neighbor while searching a KD-tree may be an efficient operation performed in O(log N) time, where N is the number of nodes in the tree.

The machine learning model (170) may be implemented as various types of deep learning classifiers such as a neural network classifier (e.g., based on convolutional neural networks (CNNs)), random forest classifier, SGD classifier, lasso classifier, gradient boosting classifier, bagging classifier, ada boost classifier, ridge classifier, elastic net classifier, or NuSVR classifier. Deep learning, also known as deep structured learning or hierarchical learning, is part of a broader family of machine learning methods based on learning data representations, as opposed to task-specific algorithms. The machine learning model (170) may assign a confidence level to each classification (e.g., match) performed by the machine learning model (170).

In one or more embodiments, the machine learning model (170) includes functionality to perform the match by applying matching criteria (164A, 164N) to features generated from the attributes (118A, 118N) of the first transaction and the attributes (118A, 118N) of the transactions in the group of transactions. In one or more embodiments, the matching criteria (164A, 164N) are stored in the repository (104). In one or more embodiments, the features are generated by a feature generator (172). In one or more embodiments, the features are distances calculated using distance measures (166) of the matching criteria (164A, 164N) corresponding to the attribute types (132A, 132N) of the attributes (118A, 118N) of the transactions.

Each attribute type (132A) may have a corresponding matching criterion (164A). In one or more embodiments, the attribute type corresponding to the transaction ID (114) has a corresponding matching criterion. In one or more embodiments, a matching criterion (164A) includes a distance measure (166) and a distance constraint (168). The distance measure (166) may be a difference between an attribute (118A) in one transaction and an attribute (118A) in another transaction. For example, the distance measure (166) for a numerical attribute type (e.g., a timestamp attribute type or amount attribute type) may be a difference between the numerical values of the attributes. Alternatively, the distance measure (166) for a categorical attribute type may be a difference between coordinates in an n-dimensional space. For example, the categorical attribute type may represent a class that may be encoded as an embedding using distributional semantics techniques (e.g., using word2vec coordinates). The distance constraint (168) may include an upper bound on the value of the distance measure (166). For example, if the attribute type is a timestamp, then the distance constraint (168) may be one week. As another example, if the attribute type is a dollar amount, then the distance constraint (168) may be one dollar. Alternatively or additionally, the distance constraint (168) may include a lower bound that the distance measure (166) is required to exceed. For example, the distance constraint (168) may indicate a range of values within which the distance measure (166) is required to fall.

In one or more embodiments, the machine learning model (170) includes functionality to combine the distance measures (166) of the matching criteria (164A, 164N) into a combined distance measure that represents an overall distance between two transactions. For example, the combined distance measure may weight each individual distance measure (166) by an attribute relevance factor for the attribute type corresponding to the distance measure (166). In one or more embodiments, the combined distance measure has a corresponding distance constraint.

In one or more embodiments, the machine learning model (170) is trained to set the matching criteria (164A, 164N) for the attribute types (132A, 132N) of the attributes (118A, 118N). For example, the machine learning model (170) may be trained to set the distance measures (166) and/or distance constraints (168) of the matching criteria (164A, 164N). The machine learning model (170) may further be trained to set the attribute relevance factors for the attribute types (132A, 132N). The machine learning model (170) may be trained using labeled pairs of the transactions (112A, 112N) in the transactions table (110). For example, a pair of transactions may be labeled as "matching" or "not matching".

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
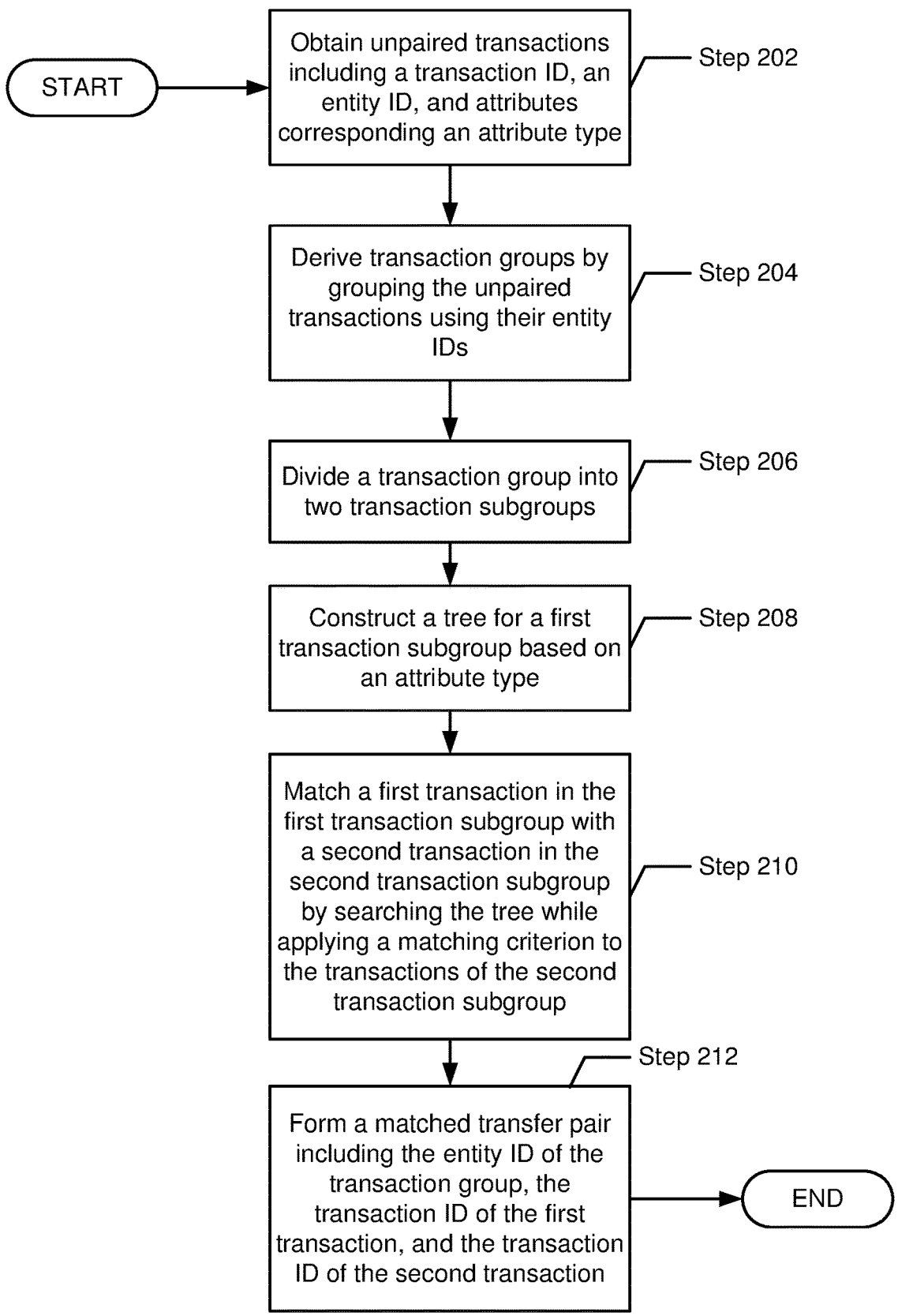
FIG. 2, FIG. 3A, FIG. 3B, and FIG. 3C show flowcharts of methods in accordance with one or more embodiments of the invention.

FIG. 2 shows a flowchart in accordance with one or more embodiments of the invention. The flowchart depicts a process for identifying matching transfer transactions. One or more of the steps in FIG. 2 may be performed by the components (e.g., the transaction analyzer (106) of the computer system (102)), discussed above in reference to FIG. 1A and FIG. 1B. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, unpaired transactions are obtained. In one or more embodiments, the transaction analyzer obtains the transactions from the unpaired transactions table. In one or more embodiments, the transaction analyzer generates the unpaired transactions table as follows:

1) initializing the unpaired transactions table with the transactions from the transactions table.

2) identifying the transactions that are already paired with another transaction by joining (e.g., on the transaction ID) the transactions in the transactions table with the matched transfer pairs of the pairing results table.

3) updating the unpaired transactions table by removing the already-paired transactions from the unpaired transactions table.

In Step 204, transaction groups are derived by grouping the unpaired transactions obtained in Step 202 above using the entity ID. For example, the transactions in a transaction group may each include a specific entity ID. In one or more embodiments, the unpaired transactions may be further grouped using one or more attribute types. For example, the unpaired transactions may be further grouped using an amount attribute type. Continuing this example, a transaction group may further correspond to unpaired transactions whose amount is a specific value (e.g., an amount of $100). Alternatively, a transaction group may further correspond to unpaired transactions with a specific account type (e.g., checking account) and/or transaction type. In one or more embodiments, the transaction analyzer distributes the processing of the transaction groups to separate computing elements (e.g., separate processes or separate computing nodes) of the computer system so that the processing of the transaction groups may proceed in parallel.

In Step 206, a transaction group is divided into a first transaction subgroup and a second transaction subgroup. In one or more embodiments, the first transaction subgroup is smaller than the second transaction subgroup. In other words, the second transaction subgroup may include at least as many transactions as the first transaction subgroup. Having the first transaction subgroup be smaller than the second transaction subgroup may improve the efficiency of constructing and searching a tree corresponding to the first transaction subgroup in Step 208 and Step 210 below, depending on how often the tree is searched relative to how often the tree is constructed and/or modified. For example, a tree constructed for the first transaction subgroup would be smaller than a tree constructed for the second transaction subgroup. In one or more embodiments, the tree is a KD-tree that is searched frequently, and constructed rarely (e.g., the KD-tree may be constructed once), in which case a smaller tree would speed up search time and improve overall performance. The first transaction subgroup may contain transactions that include an amount whose sign is positive. In other words, the first transaction subgroup may contain transactions that correspond to credits (e.g., incoming funds deposited into an account corresponding to an account ID attribute of the transaction). Alternatively, the first transaction subgroup may contain transactions that include an amount whose sign is negative. In other words, the first transaction subgroup may contain transactions that correspond to debits (e.g., outgoing funds withdrawn from an account corresponding to an account ID attribute of the transaction).

In Step 208, a tree is constructed for the first transaction subgroup based on an attribute type. In one or more embodiments, the tree is a KD-tree. For example, the attribute type may be a timestamp. Continuing this example, a node corresponding to a transaction T may be added to the tree based on comparing the timestamp of transaction T to the timestamps of the transactions corresponding to the nodes already in the tree. In one or more embodiments, the tree may be constructed using one or more additional attribute types and/or the transaction ID of the transactions in the first transaction subgroup. For example, the additional attribute types may include: the account ID, a transaction type, a financial institution ID, categorical attributes, etc.

In Step 210, a first transaction in the first transaction subgroup is matched with a second transaction in the second transaction subgroup by searching the tree while applying a matching criterion to the transactions of the second transaction subgroup. In one or more embodiments, the search is a nearest neighbor search. In one or more embodiments, the matching criterion corresponds to an attribute type used in constructing the tree in Step 208 above. The matching criterion may include a distance measure and a distance constraint. For example, the transaction analyzer may determine that, of all the transactions in the second transaction subgroup the distance between the first transaction and the second transaction is: 1) the smallest, and 2) satisfies the distance constraint. In other words, the second transaction may be classified as the best match (e.g., nearest neighbor) to the first transaction. For example, the attribute type may be a timestamp whose corresponding distance measure may be the difference between two timestamps. The distance constraint for the timestamp may be an upper bound of one week (e.g., the difference between two timestamps cannot exceed one week). For example, the first transaction may include a timestamp of Jul. 1, 2019, and the second transaction may include a timestamp of Jul. 8, 2019. The second transaction may represent a match to the first transaction because: 1) the distance between the timestamps of the first transaction and the second transaction is the smallest relative to the distances between the timestamps of the first transaction and any other transaction in the second transaction subgroup, and 2) the distance between the timestamps of the first transaction and the second transaction is one week, which satisfies the distance constraint.

In one or more embodiments, the combination of the entity ID, the transaction ID of the first transaction, and the transaction ID of the second transaction is unique. In other words, in one or more embodiments, a transaction is matched with at most one other transaction. In one or more embodiments, when multiple transactions are classified as the best match to the first transaction (e.g., when the distances between the first transaction and the multiple transactions are the same), then one of the multiple matching transactions may be selected (e.g., at random) as the best match to the first transaction.

In one or more embodiments, the second transaction is matched with the first transaction by applying multiple matching criteria corresponding to multiple attribute types. The transaction analyzer may combine the multiple distance measures of the multiple matching criteria into a combined distance measure. The transaction analyzer may combine the multiple distance measures by calculating a weighted sum of the multiple distance measures. The weight corresponding to a distance measure may be the attribute relevance factor for the attribute type corresponding to the distance measure. The weighted sum may represent a confidence level corresponding to the classification of the second transaction as a best match with the first transaction.

In one or more embodiments, the transaction analyzer identifies, while searching the tree, a set of transactions as candidates to match the first transaction. Then, in one or more embodiments, the machine learning model functions as a "gatekeeper" that performs the matching relative to features generated (e.g., distance vectors) from attributes of the set of candidate transactions.

In Step 212, a matched transfer pair is formed including the entity ID, the transaction ID of the first transaction, and the transaction ID of the second transaction. In one or more embodiments, the transaction analyzer adds the matched transfer pair to the pairing results table. In one or more embodiments, now that the first transaction and the second transaction have been paired, the transaction analyzer removes the first transaction and the second transaction from the unpaired transactions table. Alternatively, the transaction analyzer may keep the first transaction and the second transaction in the unpaired transactions table and tag both the first transaction and the second transaction as "paired" (e.g., by setting a flag in the first transaction and the second transaction indicating whether or not the transaction has been paired). In one or more embodiments, the transaction analyzer removes the node corresponding to the first transaction from the tree (e.g., to reduce the number of nodes in the tree to be searched, now that the first transaction has been paired). Alternatively, the transaction analyzer may keep the first transaction in the tree and tag the first transaction as "paired".

Figure 3A:
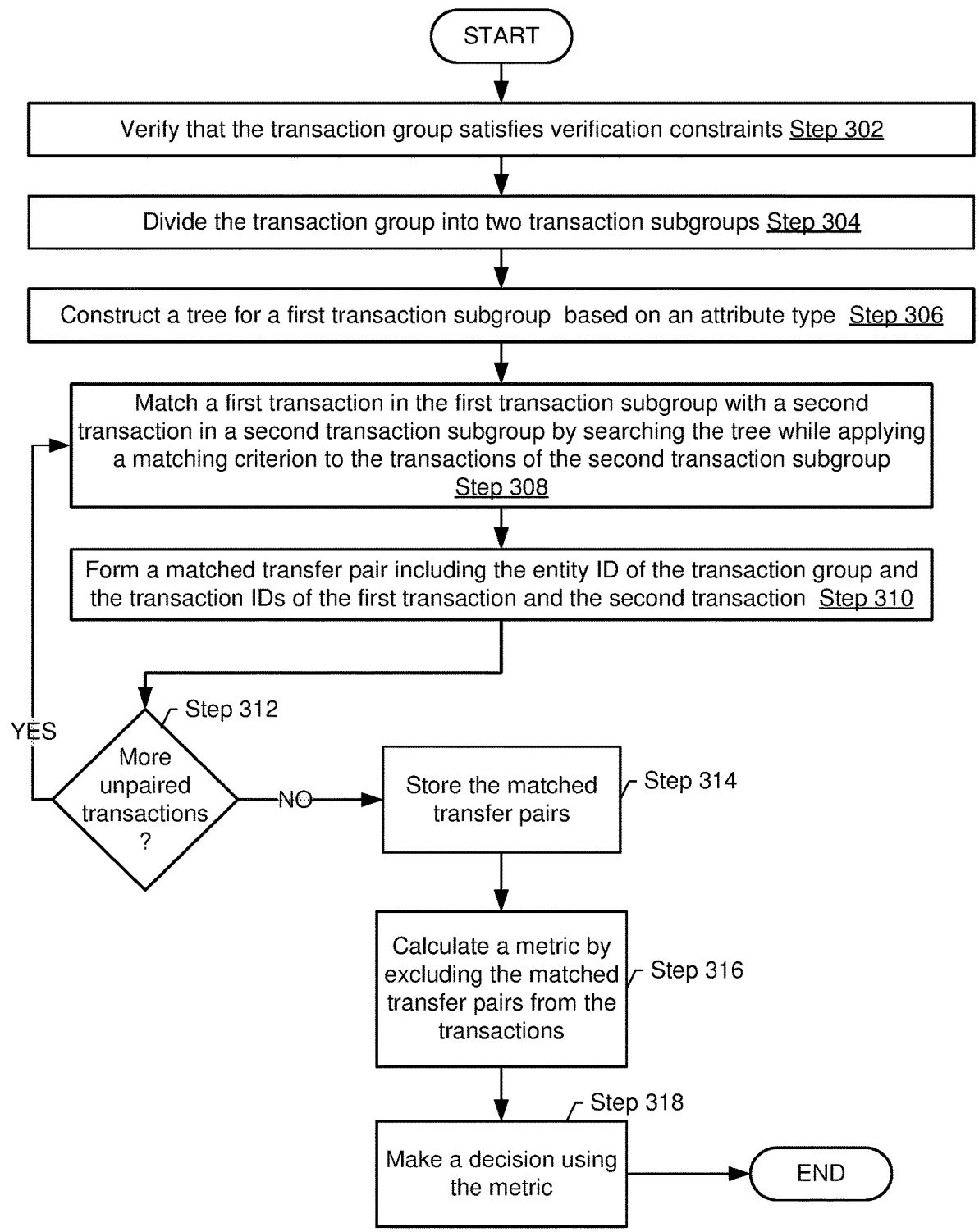

FIG. 3A shows a flowchart in accordance with one or more embodiments of the invention. The flowchart depicts a process for identifying matching transfer transactions. One or more of the steps in FIG. 3A may be performed by the components (e.g., the transaction analyzer (106) and the application (128) of the computer system (102)), discussed above in reference to FIG. 1A and FIG. 1B. In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 302, it is verified that the transaction group satisfies verification constraints. In one or more embodiments, the verification constraints are conditions that must be satisfied in order for the transaction group to include a matching transfer transaction. For example, the transactions in the transaction group may include an account ID attribute and an amount attribute. Continuing this example, the verification constraints may include:

1) the transaction group includes a transaction whose amount has a positive sign, 2) the transaction group includes a transaction whose amount has a negative sign, and 3) the transaction group includes two transactions including different account IDs.

In one or more embodiments, if the transaction group fails to satisfy the verification constraints, then the transaction group is not processed further. Thus, the efficiency and scalability of the process described in FIG. 3A may be increased by filtering out transaction groups that fail to satisfy the verification constraints.

In Step 304, a transaction group is divided into a first transaction subgroup and a second transaction subgroup (see description of Step 206 above).

In Step 306, a tree is constructed for the first transaction subgroup based on an attribute type (see description of Step 208 above).

In Step 308, a first transaction in the first transaction subgroup is matched with a second transaction in the second transaction subgroup by searching the tree while applying a matching criterion to the transactions of the second transaction subgroup (see description of Step 210 above).

In Step 310, a matched transfer pair is formed including the entity ID, the transaction ID of the first transaction, and the transaction ID of the second transaction (see description of Step 212 above).

If, in Step 312, a determination is made that there is at least one unpaired transaction remaining in the first transaction subgroup, and there is at least one unpaired transaction remaining in the second transaction subgroup, then Step 308 above is again executed to match another transaction in the first transaction subgroup with a transaction in the second transaction subgroup. Otherwise, if in Step 312 a determination is made that there are no unpaired transactions remaining in the first transaction subgroup or the second transaction subgroup, then Step 314 below is executed.

In Step 314, the matched transfer pairs formed in Step 310 are stored in a repository. The transaction analyzer may store the matched transfer pairs in the pairing results table.

In Step 316, a metric corresponding to the attribute type is calculated by excluding the matched transfer pair from a subset of the transactions that correspond to the attribute. The transaction analyzer may exclude the matched transfer pairs from the subset of the transactions by joining the transactions table and the pairing results table. As an example, the metric may be a financial metric such as the revenue or expenses of a business entity identified by a specific business entity ID. Continuing this example, calculating the financial metric is based on the transactions that correspond to the specific business entity ID. However, calculating the financial metric may exclude the transactions in the matched transfer pair, since the transactions in the matched transfer pair do not count as either revenue or expenses. Instead, the transactions in the matched transfer pair represent an internal transfer of money between accounts corresponding to the specific business entity ID. In other words, revenue and expenses correspond to transfers between different business entities, rather than transfers within the same business entity. Thus, all transactions whose transaction IDs appear in a matched transfer pair may be excluded from the calculation of the financial metric. Without performing the matching of Step 310 above, the linkage between the transactions in the matched transfer pair may not be apparent, since the representation of the individual transactions does not include this linkage.

In Step 318, a decision is made using the metric. For example, the decision may be a lending decision and the metric may be the revenue of a business entity corresponding to a specific business entity ID. Continuing this example, the lending decision correctly excludes any consideration of internal money transfers (e.g., between accounts of the business entity).

Figure 3B:
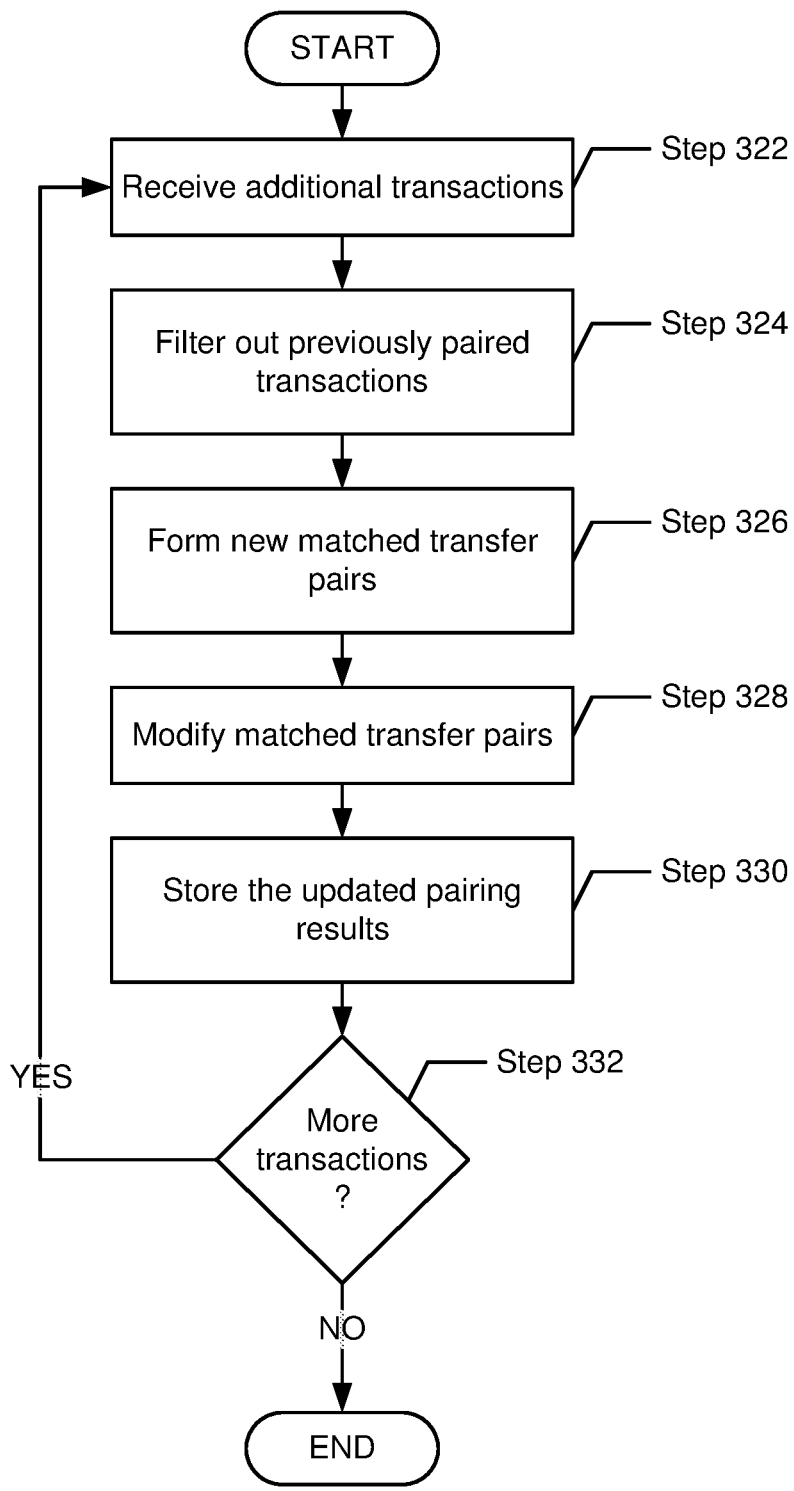

FIG. 3B shows a flowchart in accordance with one or more embodiments of the invention. The flowchart depicts a process for identifying matching transfer transactions. One or more of the steps in FIG. 3B may be performed by the components (e.g., the transaction analyzer (106) and the application (128) of the computer system (102)), discussed above in reference to FIG. 1A and FIG. 1B. In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 322, additional transactions are received. In one or more embodiments, the transaction analyzer receives (e.g., downloads) the transactions from a transaction source (e.g., a financial institution that stores financial transactions). In one or more embodiments, the additional transactions are received at periodic intervals (e.g., daily or weekly). In one or more embodiments, the transactions are received in response to a request (e.g., a user requests a download of transactions). For example, the request may specify that the additional transactions satisfy a query based on the entity ID and one or more attributes. For example, the query may request transactions whose timestamp is within a specific time interval and/or whose amount is within a specific amount range. In one or more embodiments, the transaction analyzer receives the transactions from the transaction source in response to a notification from the transaction source that additional transactions are available. A time constraint may be imposed on the receipt of additional transactions. For example, additional transactions may be required to have a timestamp that is within one year of the date the transaction is received. In one or more embodiments, the transaction analyzer stores the additional transactions in the repository (e.g., in the transactions table).

In Step 324, previously paired transactions are filtered from the additional transactions. For example, the transaction analyzer may identify the previously paired transactions by joining (e.g., on the transaction ID) the additional transactions with the matched transfer pairs of the pairing results table (see description of Step 202 above).

In Step 326, a new matched transfer pair is formed by matching an additional transaction received in Step 322 above with an unpaired transaction. In one or more embodiments, the transaction analyzer performs the matching by applying the matching criterion to the additional transaction and the unpaired transactions in the unpaired transactions table to determine a best match for the additional transaction (see description of Step 210 and Step 212 above).

The transaction analyzer may assign the additional transaction to a transaction group based on the additional transaction having a specific entity ID (see description of Step 204 above). The transaction analyzer may further assign the additional transaction to a transaction subgroup of the transaction group (see description of Step 206 above). The transaction analyzer may perform the matching by applying the matching criterion to the additional transaction and the unpaired transactions in the unpaired transactions table that are in the same transaction group as the additional transaction.

In Step 328, a matched transfer pair is modified. In one or more embodiments, an additional transaction received in Step 322 above updates the attribute of the first transaction. In one or more embodiments, the transaction analyzer determines (e.g., by applying the machine learning model) that an unpaired transaction is a better match to the updated first transaction than the second transaction. The unpaired transaction may be in the second transaction subgroup. The transaction analyzer may then replace, in the matched transfer pair formed in Step 310 above, the transaction ID of the second transaction with the transaction ID of the unpaired transaction. Alternatively, on one or more embodiments, the transaction analyzer deletes the matched transfer pair formed in Step 310 above in response to the update of the first transaction (e.g., if the distance between the updated first transaction and the second transaction fails to satisfy the distance constraint of the matching criterion).

In Step 330, the updated pairing results from Step 326 and Step 328 above are stored in a repository (see description of Step 314 above).

If, in Step 332, a determination is made that there are additional transactions to be received, then Step 322 above is again executed to receive the additional transactions.

Figure 3C:
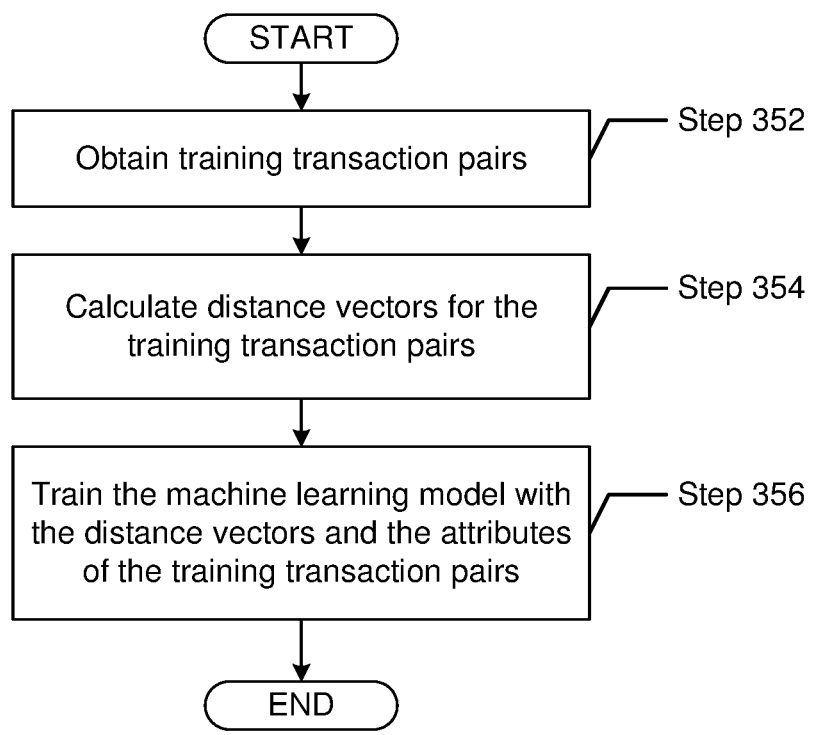

FIG. 3C shows a flowchart in accordance with one or more embodiments of the invention. The flowchart depicts a process for training a machine learning model, such as the machine learning model (170) described above in reference to FIG. 1A and FIG. 1B. In one or more embodiments of the invention, one or more of the steps shown in FIG. 3C may be omitted, repeated, and/or performed in parallel, or in a different order than the order shown in FIG. 3C. Accordingly, the scope of the invention should not be considered limited to the specific arrangement of steps shown in FIG. 3C.

Initially, in Step 352, training transaction pairs are obtained. The training transaction pairs may be obtained from the transactions table. Each of the training transaction pairs may be labeled as "matching" or "not matching". In one or more embodiments, a training transaction pair is labeled as "matching" when the transaction IDs of the training transaction pair appear in a matched transfer pair in the pairing results table. Alternatively, a training transaction pair may be labeled as "not matching" when the transaction IDs of the training transaction pair fail to appear in a matched transfer pair in the pairing results table.

In Step 354, distances are calculated for the training transaction pairs. In one or more embodiments, the distances (e.g., distance vectors) are features generated using the distance measures of the matching criteria corresponding to the attribute types of the attributes of the training transaction pairs.

In Step 356, the machine learning model is trained with the distances and the attributes of the training transaction pairs. In one or more embodiments, the machine learning model is trained to learn the correlation of distances to a probability that a transaction pair represents a match. In one or more embodiments, training the machine learning model includes setting the distance constraints of the matching criteria corresponding to the attribute types of the attributes of the training transaction pairs. For example, the distance constraint for a timestamp attribute type may be a window of one week (e.g., such that the difference between the timestamps in a transaction pair is required to be within one week). In one or more embodiments, training the machine learning model includes setting the attribute relevance factors that are used to weight each distance measure.

Figure 4A:
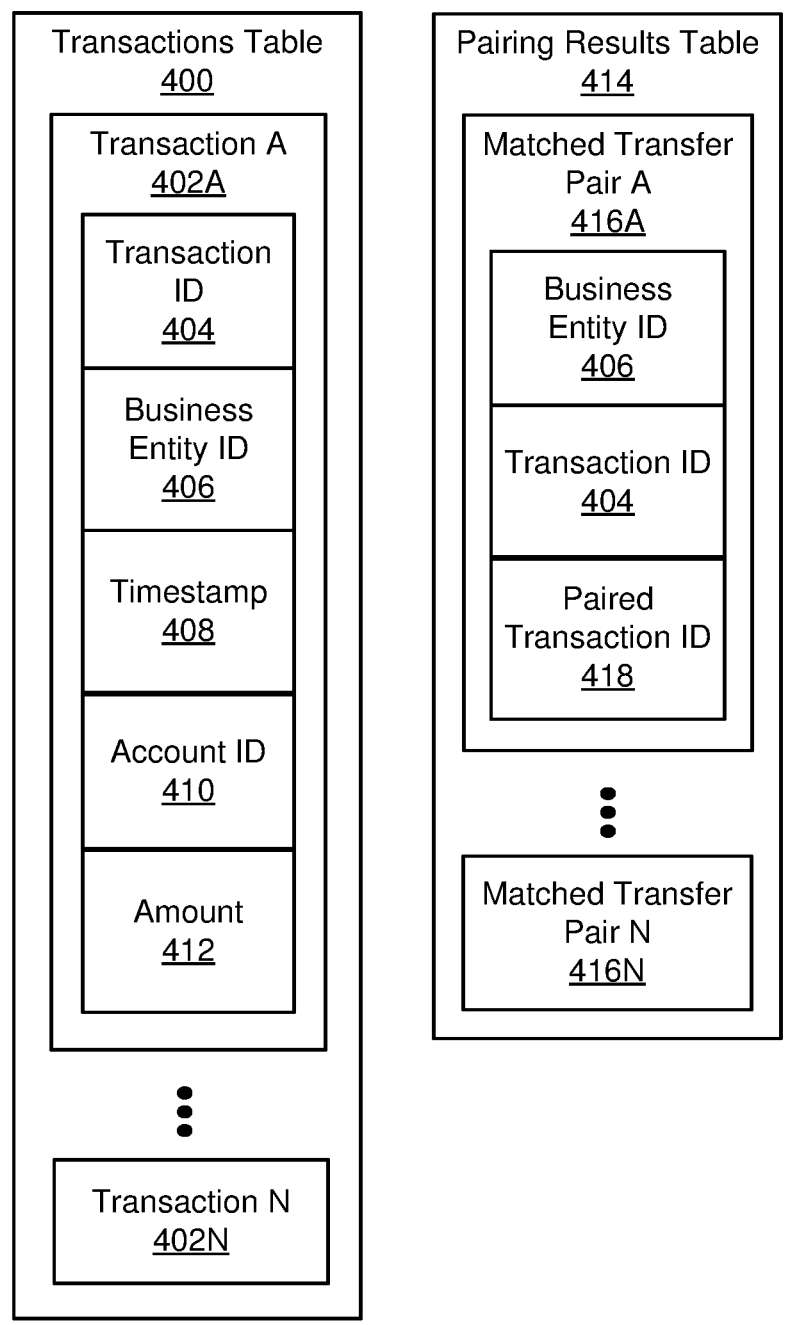
Figure 4B:
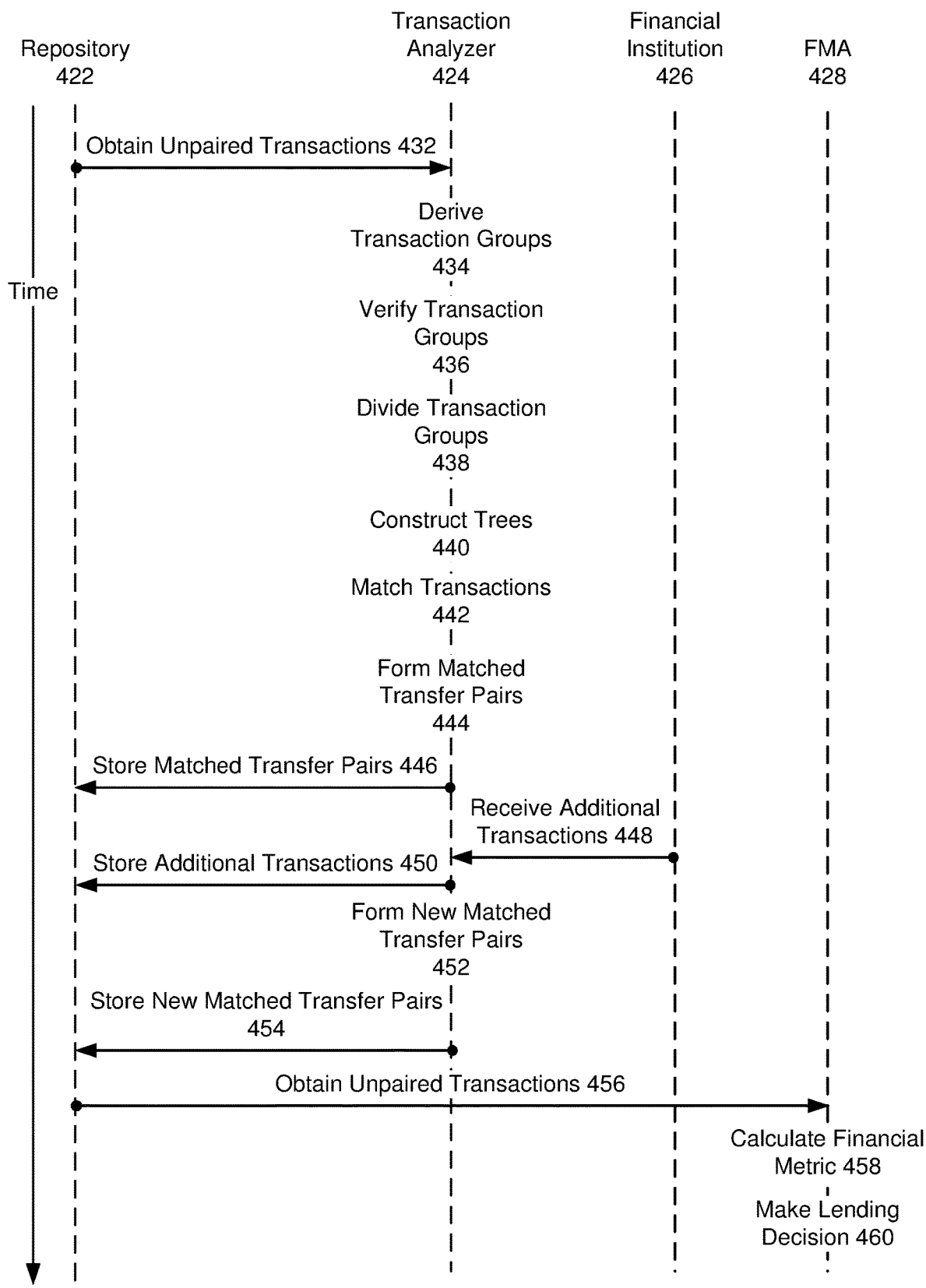

FIG. 4A, FIG. 4B, and FIG. 4C show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 4A shows a transactions table (400) ((110) in FIG. 1A) and a pairing results table (414) ((120) in FIG. 1A) that includes attributes (408, 410, 412) ((118A, 118N) in FIG. 1A). The transactions table (400) includes transactions (402A, 402N) ((112A, 112N) in FIG. 1A) and the pairing results table (414) includes matched transfer pairs (416A, 416N) ((122A, 122N) in FIG. 1A). FIG. 4A shows that each transaction (402A) includes a transaction ID (404) ((114) in FIG. 1A), a business entity ID (406) ((116) in FIG. 1A), and the following attributes: a timestamp (408), an account ID (410) and an amount (412). The business entity ID (406) is an identifier of a company associated with the transaction (402A) (e.g., a company sending or receiving an amount of money). The timestamp (408) is a point in time when the transaction (402A) occurred. The account ID (410) is an identifier associated with a group of transactions of a financial institution (e.g., a bank credit card company, brokerage company, etc.). The account ID (410) corresponds to an account owned by a business entity identified by a business entity ID (406). The amount (412) is a numerical quantity associated with the transaction (402A). The amount has a positive sign when the transaction (402A) corresponds to a credit that deposits funds into the account identified by the account ID (410). The amount has a negative sign when the transaction (402A) corresponds to a debit that withdraws funds from the account identified by the account ID (410). FIG. 4A also shows that each matched transfer pair (416A) includes a business entity ID (406), a transaction ID (404) and a paired transaction ID (418) ((124) in FIG. 1A). That is, the matched pair of transactions identified in each matched transfer pair (416A) both correspond to a specific business entity ID.

FIG. 4B illustrates, in accordance with one or more embodiments, the relative timing of steps performed by one or more components described in reference to FIG. 1A and FIG. 1B, in accordance with the flowcharts in FIG. 2, FIG. 3A, and FIG. 3B. These components include: a repository (422) ((104) in FIG. 1A), a transaction analyzer (424) ((106) in FIG. 1A), a transaction source, in this case, a financial institution (426) ((130A, 130N) in FIG. 1A), and a financial management application (FMA) (428) ((128) in FIG. 1A).

As shown in FIG. 4B, initially, in Step 432, the transaction analyzer (424) obtains unpaired transactions from the repository (422). As shown in FIG. 4C, the transaction analyzer (424) initializes an initial unpaired transactions table (470) ((152) in FIG. 1B) with transactions from the transactions table. At this point, no transactions have yet been paired (i.e., the pairing results table is empty). FIG. 4C shows that the initial unpaired transactions table (470) includes transactions (482A, 482B, 482C, 482D, 482E, 482F, 482G, 482H, 482I, 482J) which include the business entity ID (472), account ID (474), transaction ID (476), timestamp (478), and amount (480).

In Step 434, the transaction analyzer (424) derives transaction groups (484A, 484B, 484C) ((154A, 154N) in FIG. 1B) by grouping the transactions (482A, 482B, 482C, 482D, 482E, 482F, 482G, 482H, 482I, 482J) using the business entity ID (472) and the amount (480). In this example, each of the transactions (482A, 482B, 482C, 482D, 482E, 482F, 482G, 482H, 482I, 482J) has the same value, "c001", of the business entity ID (472), which identifies a small business called Lou's Lumber. Transaction group A (484A) includes transactions (482A, 482B, 482C, 482D, 482E) with an amount whose magnitude is between $800 and $1200. Transaction group B (484B) includes transactions (482F, 482G, 482H) with an amount whose magnitude is under $100. Transaction group C (484C) includes transactions (482I, 482J) with an amount whose magnitude is between $4000 and $6000.

In Step 436, before processing the transaction groups (484A, 484B, 484C), the transaction analyzer (424) verifies that the transaction groups (484A, 484B, 484C) satisfy verification constraints. The verification constraints require that a transaction group includes a transaction with a positive amount, a transaction with a negative amount, and two transactions including different account IDs. For example, the verification constraints are satisfied by transaction group A (484A) at least by transaction A (482A) and transaction B (482B). Similarly, the verification constraints are satisfied by transaction group B (484B) at least by transaction F (482F) and transaction G (482G). However, transaction group C (484C) fails to satisfy the verification constraints because the transactions (482I, 482J) in transaction group C (484C) have the same account ID. Thus, the transaction analyzer (424) excludes transaction group C (484C) from further analysis.

In Step 438, the transaction analyzer (424) divides transaction group A (484A) into an incoming transaction subgroup containing transaction A (482A) and transaction D (482D), corresponding to deposits, and an outgoing transaction subgroup containing transaction B (482B), transaction C (482C), and transaction E (482E), corresponding to withdrawals. Similarly, the transaction analyzer (424) divides transaction group B (484B) into an incoming transaction subgroup containing transaction G (482G), and an outgoing transaction subgroup containing transaction F (482F) and transaction H (482H).

In Step 440, the transaction analyzer (424) constructs a tree for the incoming transaction subgroup of transaction group A (484A) using the timestamp (478) because the incoming transaction subgroup of transaction group A (484A) is smaller than the outgoing transaction subgroup of transaction group A (484A). It is unnecessary for the transaction analyzer (424) to construct a tree for the incoming transaction subgroup of transaction group B (484B) because the incoming transaction subgroup of transaction group B (484B) contains a single transaction (482G).

In Step 442, the transaction analyzer (424) attempts to identify matching transactions in transaction group A (484A) that satisfy matching criteria by performing a nearest neighbor search on the tree for the incoming transaction subgroup (482A, 482D) of transaction group A (484A) using the transactions in the outgoing transaction subgroup (482B, 482C, 482E) of transaction group A (484A). The matching criterion corresponding to the timestamp attribute type is: 1) a distance measure calculated as the difference between the timestamps of the transactions, and 2) a distance constraint that sets an upper bound of one week on the distance measure. The attribute relevance factor (e.g., weight) for the timestamp attribute type is 5. The matching criterion corresponding to the amount attribute type is: 1) a distance measure calculated as the difference between the magnitudes of the amounts of the transactions, and 2) a distance constraint that sets an upper bound of one dollar on the distance measure. That is, the magnitudes of the amounts of the matching transactions must be within one dollar of each other. The attribute relevance factor (e.g., weight) for the amount attribute type is 10. The matching criterion corresponding to the transaction ID is a distance measure calculated as the difference between the transaction IDs, without any distance constraint. The attribute relevance factor (e.g., weight) for the transaction ID is 0.1 (one tenth). The distance measure for the transaction ID is essentially a "tie-breaker" when the distance measures corresponding to the other attribute types are equivalent. The combined distance measure between two transactions is the sum of the distance measures corresponding to the timestamp attribute type, the amount attribute type, and the transaction ID (476), weighted by the corresponding attribute relevance factors.

The transaction analyzer (424) matches transaction A (482A) with transaction B (482B). The combined distance between transaction A (482A) and transaction B (482B) is: 5*0+10*1+0.1*1=10.1. The distance constraints corresponding to the timestamp attribute type and the amount attribute type are satisfied by the transaction pair consisting of transaction A (482A) and transaction B (482B).

The transaction analyzer (424) also matches transaction D (482D) with transaction E (482E), while transaction C (482C) remains unpaired. The transaction analyzer (424) matches transaction D (482D) and transaction E (482E) because the combined distance between transaction D (482D) and transaction E (482E) is: 5+10*0+0.1*1=5.1, while the combined distance between transaction D (482D) and transaction C (482C) is: 5*3+10*0+0.1*1=15.1. The distance constraints corresponding to the timestamp attribute type and the amount attribute type are satisfied by the transaction pair consisting of transaction D (482D) and transaction E (482E).

The transaction analyzer (424) next attempts to find matching transactions in transaction group B (484B). The transaction analyzer (424) matches transaction G (482G) with transaction H (482H), while transaction F (482F) remains unpaired. The transaction analyzer (424) matches transaction G (482G) and transaction H (482H) because the combined distance between transaction G (482G) and transaction H (482H) is: 5*1+10*0+0.1*1=5.1, while the combined distance between transaction G (482G) and transaction F (482F) is: 5*1+10*0+0.1*2=5.2. In this case, the distance between the transaction ID "t009" of transaction H (482H) and the transaction ID "t008" of transaction G (482G) is 1, while the distance between the transaction ID "t006" of transaction F (482F) and the transaction ID "t008" of transaction G (482G) is 2, so the distance corresponding to the transaction ID (476) breaks the tie, since the distances corresponding to the timestamp attribute type and the amount attribute type are equivalent. The distance constraints corresponding to the timestamp attribute type and the amount attribute type are satisfied by the transaction pair consisting of transaction G (482G) and transaction H (482H).

In Step 444, the transaction analyzer (424) forms matched transfer pairs corresponding to the matching transactions identified in Step 442 above. The transaction analyzer (424) adds the matched transfer pairs to the pairing results table (490), as shown in FIG. 4D. FIG. 4D shows that the pairing results table (490) includes matched transfer pairs (494A, 494B, 494C) which include the business entity ID attribute (472), the transaction ID attribute (474), and the paired transaction ID attribute (492). The matched transfer pairs represent internal transfers of money between different accounts of Lou's Lumber.

In Step 446, the transaction analyzer (424) stores the matched transfer pairs (494A, 494B, 494C) in the repository (422) (e.g., by updating the pairing results table (490) in the repository (422)).

In Step 448, the transaction analyzer (424) receives additional transactions from the financial institution (426). FIG. 4C shows that the additional transactions (486) include transaction K (482K) and transaction L (482L). In Step 450, the transaction analyzer (424) stores the additional transactions (486) in the repository (422) (e.g., in the unpaired transactions table and/or the transactions table of the repository (422)).

In Step 452, the transaction analyzer (424) forms a new matched transfer pair by matching transaction K (482K) with still-unpaired transaction C (482C). The combined distance between transaction C (482C) and transaction K (482K) is: $5*1+10*0+0.1*4=5.4$. The distance constraints corresponding to the timestamp attribute type and the amount attribute type are satisfied by the transaction pair consisting of transaction C (482C) and transaction K (482K). The transaction analyzer (424) adds the new matched transfer pair (494D) to the pairing results table (490), as shown in FIG. 4D. In Step 454, the transaction analyzer (424) stores the new matched transfer pair (494D) in the repository (422).

In Step 456, the FMA (428) obtains unpaired transactions from the repository (422) by: 1) loading the transactions from the transactions table into a temporary table; 2) identifying the transactions that are already paired with another transaction by joining, on the transaction ID, the transactions in the transactions table with the matched transfer pairs of the pairing results table; 3) removing the already-paired transactions from the temporary table; and 4) loading the transactions remaining in the temporary table into an updated unpaired transaction table. FIG. 4E shows that the updated unpaired transaction table (499) includes the transactions of the initial unpaired transaction table (470) of FIG. 4C minus the matched transfer pairs of the pairing results table (490) of FIG. 4D. That is, any transaction whose transaction ID is included in the pairing results table (490) is excluded from the updated unpaired transaction table (499).

In Step 458, the FMA (428) calculates the revenue of Lou's Lumber using the transactions in the updated unpaired transaction table (499). Thus, the revenue calculation is not distorted by internal transfers of money between the various accounts controlled by Lou's Lumber.

In Step 460, the FMA (428) makes a lending decision using an accurate revenue calculation undistorted by any internal money transfers.

Figure 5A:
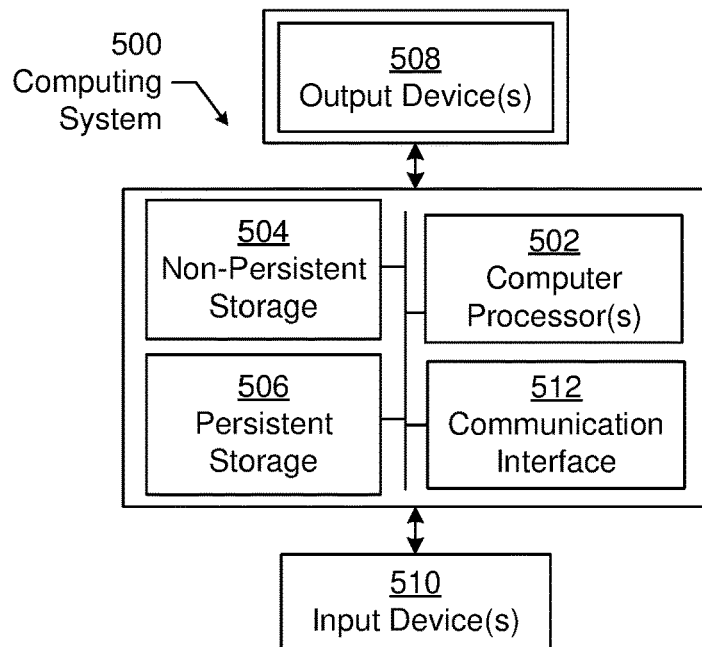
FIG. 5A and FIG. 5B show a flow diagram of computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
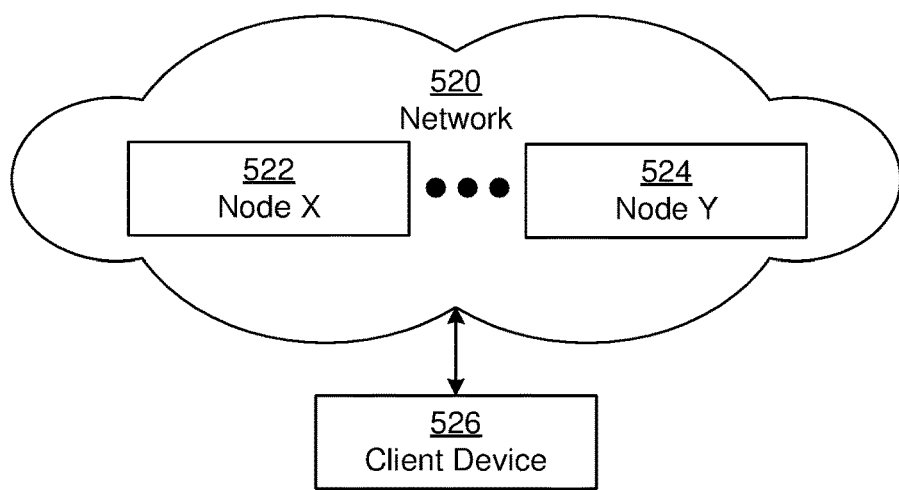

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (e.g., database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    obtaining a first plurality of unpaired transactions, each comprising a transaction ID, an entity ID, and a plurality of attributes that each correspond to an attribute type of one or more attribute types;
    deriving a plurality of transaction groups by grouping the first plurality of unpaired transactions using their entity IDs;
    dividing a transaction group of the plurality of transaction groups into a first transaction subgroup and a second transaction subgroup;
    constructing a tree for the first transaction subgroup based on a first attribute type of the one or more attribute types;
    training, using distances generated from attributes of the first attribute type in pairs of historical transactions, a machine learning model to set a distance constraint corresponding to the first attribute type, wherein training the machine learning model comprises:
        obtaining the pairs of historical transactions, wherein each pair corresponds to a label indicating whether transaction IDs of the pair are comprised by a matched transfer pair, and calculating a distance for the pair using a distance measure of a matching criterion corresponding to the first attribute type;

matching, using the machine learning model, a first transaction of the first transaction subgroup with a second transaction of the second transaction subgroup by searching the tree while applying a first matching criterion to the transactions of the second transaction subgroup, the first matching criterion corresponding to the first attribute type, wherein applying the first matching criterion comprises determining whether a distance between a first attribute of the first transaction and a second attribute of the second transaction satisfies the distance constraint, and wherein the first attribute of the first transaction and the second attribute of the second transaction correspond to the first attribute type; and in response to matching the first transaction with the second transaction, forming a first matched transfer pair comprising the entity ID of the transaction group, the transaction ID of the first transaction, and the transaction ID of the second transaction.

2. The method of claim 1, further comprising:
verifying that the transaction group satisfies one or more verification constraints corresponding to one or more of the plurality of attributes,
wherein the transaction group is divided into the first transaction subgroup and the second transaction subgroup in response to the verifying.

3. The method of claim 1, wherein the first matched transfer pair is the only matched transfer pair comprising the transaction ID of the first transaction, the transaction ID of the second transaction, and the entity ID of the transaction group.

4. The method of claim 1, further comprising:
calculating a metric corresponding to the entity ID of the transaction group by excluding the first matched transfer pair from a subset of the first plurality of unpaired transactions that comprise the entity ID of the transaction group.

5. The method of claim 1, further comprising:
receiving a second plurality of transactions;
determining that the second plurality of transactions updates the first transaction;
matching the updated first transaction with a third transaction of the second transaction subgroup by applying the first matching criterion to the transactions of the second transaction subgroup; and
in response to matching the updated first transaction with the third transaction, replacing, in the first matched transfer pair, the transaction ID of the second transaction with the transaction ID of the third transaction.

6. The method of claim 1, further comprising:
receiving a second plurality of transactions comprising a third transaction, the third transaction comprising the entity ID of the transaction group;
assigning the third transaction to the first transaction subgroup;
matching the third transaction with a fourth transaction of the second transaction subgroup by applying the first matching criterion to the transactions of the second transaction subgroup; and
in response to matching the third transaction with the fourth transaction, forming a second matched transfer pair comprising the entity ID of the transaction group, the transaction ID of the third transaction, and the transaction ID of the fourth transaction.

7. The method of claim 1, wherein matching the first transaction with the second transaction further comprises searching the tree while applying a second matching criterion corresponding to a second attribute type of the one or more attribute types, the method further comprising:
combining, using a first attribute relevance factor corresponding to the first attribute type and a second attribute relevance factor corresponding to the second attribute type, a first distance corresponding to the first attribute and a second distance corresponding to the second attribute; and
setting, using the machine learning model, the first attribute relevance factor and the second attribute relevance factor.

8. A system, comprising:
a memory coupled to a computer processor;
a repository configured to store:
a first plurality of unpaired transactions, each comprising a transaction ID, an entity ID, and a plurality of attributes that each correspond to an attribute type of one or more attribute types,
a plurality of transaction groups, and
a tree for a first transaction subgroup of a transaction group of the plurality of transaction groups, wherein the transaction group corresponds to the entity ID; and
a transaction analyzer, executing on the computer processor and using the memory, configured to:
derive the plurality of transaction groups by grouping the first plurality of unpaired transactions using their entity IDs;
divide the transaction group into the first transaction subgroup and a second transaction subgroup;
construct the tree for the first transaction subgroup based on a first attribute type of the one or more attribute types;
train, using distances generated from attributes of the first attribute type in pairs of historical transactions, a machine learning model to set a distance constraint corresponding to the first attribute type, wherein training the machine learning model comprises:
obtaining the pairs of historical transactions, wherein each pair corresponds to a label indicating whether transaction IDs of the pair are comprised by a matched transfer pair, and
calculating a distance for the pair using a distance measure of a matching criterion corresponding to the first attribute type;
match, using the machine learning model, a first transaction of the first transaction subgroup with a second transaction of the second transaction subgroup by searching the tree while applying a first matching criterion to the transactions of the second transaction subgroup, the first matching criterion corresponding to the first attribute type, wherein applying the first matching criterion comprises determining whether a distance between a first attribute of the first transaction and a second attribute of the second transaction satisfies the distance constraint, and wherein the first attribute of the first transaction and the second attribute of the second transaction correspond to the first attribute type; and
in response to matching the first transaction with the second transaction, form a first matched transfer pair comprising the entity ID of the transaction group, the transaction ID of the first transaction, and the transaction ID of the second transaction.

9. The system of claim 8, wherein the transaction analyzer is further configured to:
verify that the transaction group satisfies one or more verification constraints corresponding to one or more of the plurality of attributes,
wherein the transaction group is divided into the first transaction subgroup and the second transaction subgroup in response to the verifying.

10. The system of claim 8, further comprising an application executing on the computer processor and using the memory, configured to:
calculate a metric corresponding to the entity ID of the transaction group by excluding the first matched transfer pair from a subset of the first plurality of unpaired transactions that comprise the entity ID of the transaction group.

11. The system of claim 8, wherein the transaction analyzer is further configured to:
receive a second plurality of transactions;
determine that the second plurality of transactions updates the first transaction;
match the updated first transaction with a third transaction of the second transaction subgroup by applying the first matching criterion to the transactions of the second transaction subgroup; and
in response to matching the updated first transaction with the third transaction, replace, in the first matched transfer pair, the transaction ID of the second transaction with the transaction ID of the third transaction.

12. The system of claim 8, wherein the transaction analyzer is further configured to:
receive a second plurality of transactions comprising a third transaction, the third transaction comprising the entity ID of the transaction group;
assign the third transaction to the first transaction subgroup;
match the third transaction with a fourth transaction of the second transaction subgroup by applying the first matching criterion to the transactions of the second transaction subgroup; and
in response to matching the third transaction with the fourth transaction, form a second matched transfer pair comprising the entity ID of the transaction group, the transaction ID of the third transaction, and the transaction ID of the fourth transaction.

13. A method, comprising:
obtaining a first plurality of unpaired transactions comprising a transaction ID, a business entity ID, and a timestamp;
deriving a plurality of transaction groups by grouping the first plurality of unpaired transactions using their business entity IDs;
dividing a transaction group of the plurality of transaction groups into a first transaction subgroup and a second transaction subgroup, the transaction group corresponding to a first business entity ID;
constructing a tree for the first transaction subgroup based on the timestamp;
training, using distances generated from timestamps in pairs of historical transactions, a machine learning model to set a threshold time interval, wherein training the machine learning model comprises:
obtaining the pairs of historical transactions, wherein each pair corresponds to a label indicating whether transaction IDs of the pair are comprised by a matched transfer pair and
calculating a distance for the pair using a distance measure of a matching criterion corresponding to the timestamp;
matching, using the machine learning model, a first transaction of the first transaction subgroup with a second transaction of the second transaction subgroup by searching the tree while applying a first matching criterion to the transactions of the second transaction subgroup, the first matching criterion corresponding to the timestamp, wherein applying the first matching criterion comprises determining whether a distance between a first timestamp of the first transaction and a second timestamp of the second transaction satisfies the threshold time interval; and
in response to matching the first transaction with the second transaction, forming a first matched transfer pair comprising the first business entity ID, the transaction ID of the first transaction, and the transaction ID of the second transaction.

14. The method of claim 13, wherein the first plurality of unpaired transactions further comprises an account ID and an amount, the method further comprising:
verifying that the transaction group comprises:
a transaction comprising an amount with a positive sign,
a transaction comprising an amount with a negative sign, and
two transactions comprising different account IDs,
wherein the transaction group is divided into the first transaction subgroup and the second transaction subgroup in response to the verifying.

15. The method of claim 13, further comprising:
calculating a financial metric for the first business entity ID by excluding the first matched transfer pair from a subset of the first plurality of unpaired transactions that comprise the first business entity ID; and
making a lending decision using the financial metric for the first business entity ID.

16. The method of claim 13, further comprising:
receiving a second plurality of transactions comprising a third transaction, the third transaction comprising the first business entity ID;
assigning the third transaction to the first transaction subgroup;
matching the third transaction with a fourth transaction of the second transaction subgroup by applying the first matching criterion to the transactions of the second transaction subgroup; and
in response to matching the third transaction with the fourth transaction, forming a second matched transfer pair comprising the first business entity ID, the transaction ID of the third transaction, and the transaction ID of the fourth transaction.

17. The method of claim 13, wherein the first plurality of unpaired transactions further comprises an amount, wherein matching the first transaction with the second transaction further comprises searching the tree while applying a second matching criterion to the amounts of the transactions of the second transaction subgroup, the method further comprising:
combining, using a first attribute relevance factor corresponding to the timestamp and a second attribute relevance factor corresponding to the amount, a first distance corresponding to the timestamp and a second distance corresponding to the amount; and setting, using the machine learning model, the first attribute relevance factor and the second attribute relevance factor.

\* \* \* \* \*